(12) United States Patent
Tessiore et al.

(10) Patent No.: US 11,122,151 B2
(45) Date of Patent: *Sep. 14, 2021

(54) MULTI-PROTOCOL GATEWAY FOR CONNECTING SENSOR DEVICES TO CLOUD

(71) Applicant: Microsoft Technology Licensing, LLC, Redmond, WA (US)

(72) Inventors: Lorenzo Tessiore, Seattle, WA (US); Spyros S. Sakellariadis, Bellevue, WA (US); Olivier Bloch, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,415

(22) Filed: Nov. 30, 2018

(65) Prior Publication Data
US 2019/0191015 A1 Jun. 20, 2019

Related U.S. Application Data

(63) Continuation of application No. 14/937,140, filed on Nov. 10, 2015, now Pat. No. 10,178,206.

(51) Int. Cl.
*G06F 15/173* (2006.01)
*H04L 29/06* (2006.01)
*H04L 29/08* (2006.01)

(52) U.S. Cl.
CPC .............. *H04L 69/18* (2013.01); *H04L 67/10* (2013.01); *H04L 67/12* (2013.01); *H04L 67/2823* (2013.01); *H04L 69/16* (2013.01)

(58) Field of Classification Search
USPC ................. 701/1; 726/22; 340/540; 709/230; 370/254, 338
See application file for complete search history.

(56) References Cited

U.S. PATENT DOCUMENTS

| 9,911,308 B2* | 3/2018 | Edwards | ............ A61M 15/0001 |
| 2006/0031934 A1* | 2/2006 | Kriegel | ............... G06F 11/2294 726/22 |

(Continued)

*Primary Examiner* — Quang N Nguyen
(74) *Attorney, Agent, or Firm* — Fiala & Weaver P.L.L.C.

(57) ABSTRACT

Methods, systems, apparatuses, and computer program products are provided for connecting sensor devices to cloud servers by a gateway device. The gateway device includes a plurality of sensor adaptors, a sensor data processor, and a network communication interface. The sensor adaptors are configured to receive sensor data in communication signals from sensor devices. Each sensor adaptor is configured to extract sensor data encapsulated according to a respective sensor communication protocol. The sensor data processor is configured to process the extracted sensor data for transmission to a cloud service, such as by extracting unneeded messages data, or inserting additional data such as a time stamp. The network communication interface is configured to transmit the processed sensor data to the cloud service over a network according to a network communication protocol. Sensor data of different types may be transmitted according to corresponding types of network communication protocols.

20 Claims, 5 Drawing Sheets

(56) References Cited

U.S. PATENT DOCUMENTS

| | | | |
|---|---|---|---|
| 2006/0123129 A1* | 6/2006 | Toebes | H04L 69/08 709/230 |
| 2006/0123166 A1* | 6/2006 | Toebes | H04L 69/08 710/106 |
| 2007/0118253 A1* | 5/2007 | Dahler | F23N 5/022 701/1 |
| 2008/0036593 A1* | 2/2008 | Rose-Pehrsson | G08B 17/00 340/540 |
| 2009/0303905 A1* | 12/2009 | Lee | H04L 29/12801 370/254 |
| 2012/0057581 A1* | 3/2012 | An | H04L 67/125 370/338 |
| 2012/0155326 A1* | 6/2012 | Park | H04W 16/32 370/254 |
| 2013/0086245 A1* | 4/2013 | Lu | H04L 12/66 709/223 |
| 2016/0241988 A1* | 8/2016 | Slevin | H04Q 9/00 |
| 2017/0048079 A1* | 2/2017 | Nethi | H04L 12/2836 |
| 2017/0302756 A1* | 10/2017 | Chou | H04L 67/2828 |
| 2018/0198639 A1* | 7/2018 | Ishizaka | H04L 69/18 |
| 2018/0255457 A1* | 9/2018 | Vedantham | H04L 63/0428 |

\* cited by examiner

MULTI-PROTOCOL GATEWAY FOR CONNECTING SENSOR DEVICES TO CLOUD

CROSS REFERENCE TO RELATED APPLICATION

This application is a continuation of U.S. Pat. No. 10,178, 206, filed on Nov. 10, 2015, issued Jan. 8, 2019, titled "Multi-Protocol Gateway for Connecting Sensor Devices to Cloud," which is incorporated by reference herein in its entirety.

BACKGROUND

The Internet of Things (IoT) is a network of physical devices or "things" embedded with electronics, software, sensors, and network connectivity. Devices in the IoT may collect data (e.g., using sensors), may exchange data with each other, and/or may be controlled remotely. The development of the IoT is ushering in automation in many fields, while also enabling advanced applications like the "smart home," "smart grid," and "smart cities."

Numerous types of sensors exist and/or are being developed that can participate in the IoT. Sensor devices in IoT deployments can behave as data providers to a cloud service, which may be configured to infer relevant conclusions from the received sensor data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for connecting sensor devices to cloud servers by a gateway device. The gateway device includes a plurality of sensor adaptors, a sensor data processor, and a network communication interface. The sensor adaptors are configured to receive sensor data in communication signals from sensor devices. Each sensor adaptor is configured to extract sensor data encapsulated according to a respective sensor communication protocol. The sensor data processor is configured to process the extracted sensor data for transmission to a cloud service, such as by extracting unneeded message data, or inserting additional data such as a time stamp. The network communication interface is configured to transmit the processed sensor data to the cloud service over a network according to a network communication protocol. Sensor data of different types may be transmitted to the cloud service according to corresponding types of network communication protocols, in some implementations.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Bucketing Test Failures

The Internet of Things (IoT) is a network of physical devices or "things" embedded with electronics, software, sensors, and network connectivity. Devices in the IoT may collect data (e.g., using sensors), may exchange data with each other, and/or may be controlled remotely. The development of the IoT is ushering in automation in many fields, while also enabling advanced applications like the "smart home," "smart grid," and "smart cities."

Numerous types of sensors exist and/or are being developed that can participate in the IoT. Sensor devices in IoT deployments can behave as data providers to a cloud service, which may be configured to infer relevant conclusions from the received sensor data. Many sensor devices are resource constrained, however, and cannot implement many standard protocols that a typical desktop operating system or cloud service can easily implement. For example, many sensor devices are not capable of using HTTP (hypertext transfer protocol) as a transport to reach out to a cloud service or other device. As a consequence, sensor devices frequently cannot reach a cloud service to upload sensor data.

According to embodiments, a gateway device is inserted in a sensor device communication system. The gateway device gathers/receives data from the sensor devices according to the communication protocols that are available to the sensor devices. The gateway channels the received sensor data to the target cloud service using any of the network communication protocols available to the cloud service. The gateway device is configured to translate from the sensor device communication protocols to the one or more network communication protocols known by the cloud service. In this manner, the gateway device shoulders the burden of knowing and translating communication protocols between sensor devices and cloud service.

In an embodiment, a common message format/language may be used for the sensor data during the communications, which enables the protocol translation to be safe and efficient. A common message format/language also enables the gateway to augment the sensor data, if desired, during the protocol translation. For instance, JSON (JavaScript Object Notation) is an open standard data format that uses human-readable text to transmit data objects in the form of attribute-value pairs. In an embodiment, JSON may be an open standard data format used for messages that contain sensor data and are transmitted according to one or more sensor communication protocols.

In an embodiment, to enable the translation of protocols for the sensor data in the gateway device, a developer may provide a sensor adapter (e.g., in the form of program code) that implements a known interface, and is configured to send data over a communication protocol in a common message format/language (e.g., JSON). A message containing sensor data may hold some fixed fields that can be augmented by the gateway device, as well as a set of variable fields that a user (sensor device developer) can use in any way (e.g., to hold sensor data).

In an embodiment, a protocol adaptor for a sensor communication protocol may be coded as a pair of dynamic libraries, including (a) a first dynamic library for the sensor device and (b) a second dynamic library for the gateway device. The sensor device sends sensor data according to the first dynamic library (a) using any number of fields in the fixed data format, and any further fields desired by the sensor device implementer.

The gateway device may dynamically load the second dynamic library (b) and receive data from the matching sensor device library (a). Upon receiving sensor data, the gateway device translates the sensor data protocol to any other network protocol the cloud service uses, using one more adaptors that utilize the second dynamic library (b). The cloud service holds the second dynamic library (b) for extracting the sensor data.

In an embodiment, while translating the sensor data from the sensor communication protocol to the network communication protocol, the gateway may inspect the contents of the sensor data message, and may augment the message with additional data. For example, the gateway may inject a time stamp into a sensor data message for those sensor devices that are unable to determine or indicate the time of data acquisition.

Because the sensor adaptor implementation is independent of the gateway architecture, and the sensor adaptors are dynamically loaded, a new pair of adaptors can be implemented for an existing deployment or a new deployment to enable adding more sensor devices and/or communication protocols to an existing deployment without changing the deployment or the gateway.

Figure 1:
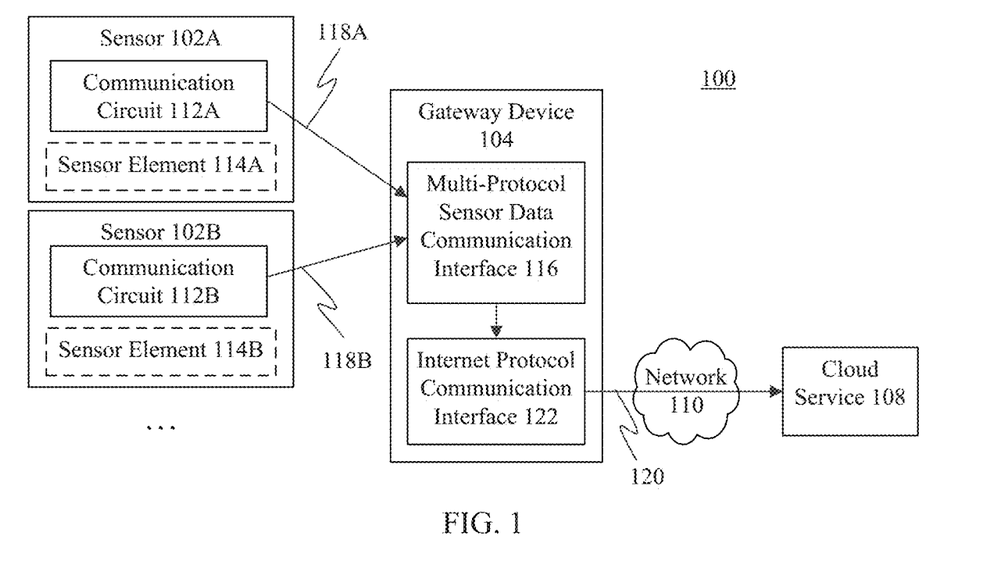
FIG. 1 shows a sensor data communication system configured to support multiple sensor communication protocols, according to an example embodiment.

Embodiments may be implemented in various ways. For instance, FIG. 1 shows a sensor data communication system 100 configured to support multiple sensor communication protocols, according to an example embodiment. As shown in FIG. 1, system 100 includes first and second sensors 102A and 102B, a gateway device 104, and a cloud service 108. First sensor 102A includes a communication circuit 112A and a sensor element 114A. Second sensor 102B includes a communication circuit 112B and a sensor element 114B. Gateway device 104 includes a multi-protocol sensor data communication interface 116 and an Internet Protocol (IP) communication interface 122. System 100 is described as follows.

Sensors 102A and 102B are each sensor devices of a same or different type. Sensor elements 114A and 114B provide the sensing functionality of sensors 102A and 102B, respectively. Sensor elements 114A and 114B may each be any type of sensor. For instance, either or both of sensor elements 114A and 114B may be pressure sensors (e.g., air pressure, water pressure), temperature sensors (e.g., home or other building temperature, human body temperature, engine temperature, environmental temperature), ultrasonic sensors, humidity sensors, gas sensors, light sensors, PIR (passive infrared) sensors, noise sensors, acceleration sensors, motion sensors, displacement sensors, biometric sensors (e.g., fingerprint sensor, heat beat sensor, blood pressure sensor, retina sensor, facial recognition sensor, voice sensor), etc. Sensor elements 114A and 114B each are configured to generate an electrical signal indicative of a sensed condition (e.g., temperature, pressure, humidity, etc.)

Communication circuits 112A and 112B each include transmitters or transceivers that enable sensor data to be transmitted from sensors 102A and 102B, respectively. Communication circuits 112A and 112B may be configured the same or differently, such as being implemented in the form of one or more processors that execute program code, one or more integrated circuits (e.g., a system-on-chip, an application specific integrated circuit (ASIC)), transmitters, transceivers, etc. Communication circuits 112A and 112B are each configured to package the electrical signal (indicating the sensed condition) as sensor data in a message (e.g., of a common standard data format), and to transmit the message encapsulated in a communication signal according to a sensor communication protocol from the corresponding one of sensor 102A or sensor 102B. Examples of sensor communication protocols that one or both of communication circuits 112A and 112B may be configured to use include USB (Universal Serial Bus), a serial port communication protocol (e.g., RS-232), Bluetooth®, and other communication protocols suitable for sensors. As used herein, sensor communication protocols do not include network communication protocols compatible for transmissions over the Internet, such as messaging protocols that may be used on top of TCP/IP (transmission control protocol/Internet protocol) and transmitted over the Internet.

Although FIG. 1 shows two sensors 102A and 102B communicatively coupled with gateway device 104, any number of sensors may be present and coupled with gateway device 104, including numbers in the tens, hundreds, or greater numbers.

Cloud service 108 is any service or application implemented in one or more computing devices (e.g., servers) that consumes sensor data and is accessible over network 110, which is a network that uses Internet-compatible network communication protocols for transmission of data in messages. Examples of such network communication protocols include Advanced Message Queuing Protocol (AMQP), Hypertext Transfer Protocol (HTTP), MQ Telemetry Transport (MQTT), and other protocols for use on top of the TCP/IP protocol. Network 110 may include the Internet.

Gateway device 104 may be any type of electronic device capable of interfacing communications between devices. For example, gateway device 104 may be a router, a switch, a bridge, a server, or other type of computing device. As shown in FIG. 1, gateway device 104 includes multi-sensor data communication interface 116 and IP communication interface 122. Multi-sensor data communication interface 116 is configured as a conduit for sensors, such as sensors 102A and 102B, of any number and type, to provide their captured sensor data to cloud service 108 over network 110. Multi-sensor data communication interface 116 may be configured to support any number of sensor communication protocols by plugging in corresponding sensor adaptors to multi-sensor data communication interface 116. Multi-sensor data communication interface 116 receives sensor data from sensors encapsulated according to any of the various supported sensor communication protocols and optionally processes the sensor data (e.g., removing information, augmenting the data). IP communication interface 122 is configured as a conduit for the sensor data to be provided to cloud service 108. IP communication interface 122 sends the sensor data to cloud service 108 according to any of one or more network communication protocols supported by IP communication interface 122.

Figure 2:
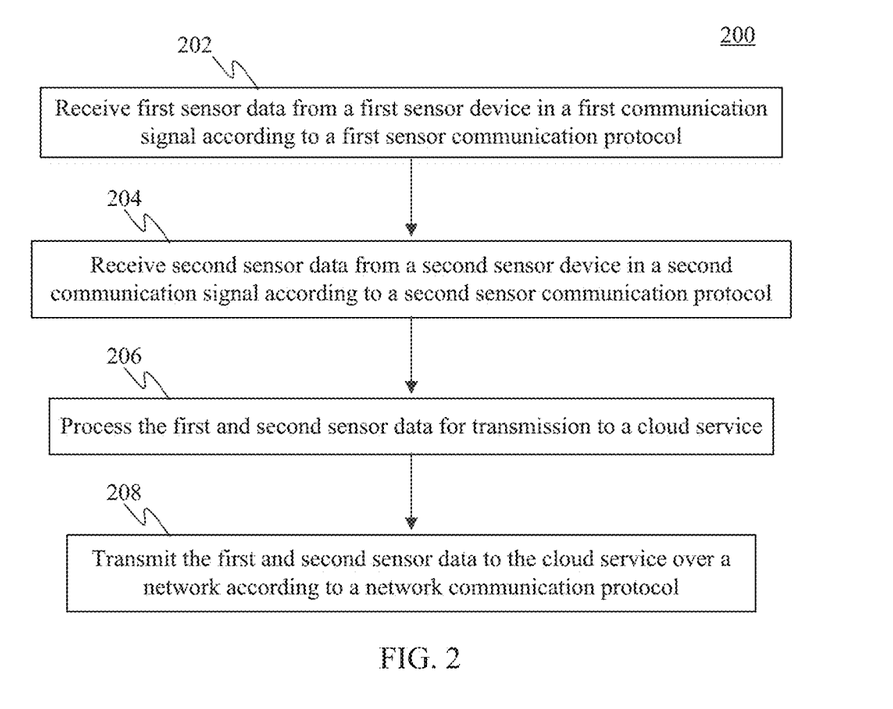
FIG. 2 shows a flowchart providing a process for a sensor data communication system to support multiple sensor communication protocols, according to an example embodiment.

Multi-sensor data communication interface 116 and IP communication interface 122 may operate in various ways, to perform these functions. For instance, in embodiments, multi-sensor data communication interface 116 may operate according to FIG. 2. FIG. 2 shows a flowchart 200 providing a process for a sensor data communication system to support multiple sensor communication protocols, according to an example embodiment. Multi-sensor data communication interface 116 and IP communication interface 122 are described as follows with reference to flowchart 200.

Flowchart 200 of FIG. 2 begins with step 202. In step 202, first sensor data is received from a first sensor device in a first communication signal according to a first sensor communication protocol. For example, as shown in FIG. 1, sensor element 114A generates an electrical signal indicating sensed information. Communication circuit 112A packages the electrical signal as first sensor data in a message. For example, the message may have a common standard data format, such as JSON. The message is encapsulated in a sensor communication protocol by communication circuit 112A, and transmitted by communication circuit 112A in a communication signal 118A. Multi-sensor data communication interface 116 at gateway device 104 receives communication signal 118A.

In step 204, second sensor data is received from a second sensor device in a second communication signal according to a second sensor communication protocol. For instance, as shown in FIG. 1, sensor element 114B generates an electrical signal indicating sensed information. Communication circuit 112B packages the electrical signal as second sensor data in a message. For example, the message may have a common standard data format, such as JSON. The message is encapsulated in a sensor communication protocol by communication circuit 112B, and transmitted by communication circuit 112B in a communication signal 118B. Note that communication circuit 112B may be configured to encapsulate second sensor data according to a sensor communication protocol different or the same as for first sensor data encapsulated by communication circuit 112A. Multi-sensor data communication interface 116 at gateway device 104 receives communication signal 118B.

In step 206, the first and second sensor data is processed for transmission to a cloud service. In an embodiment, multi-sensor data communication interface 116 processes the first sensor data received in communication signal 118A and the second sensor data in communication signal 118B. For each received communication signal, multi-sensor data communication interface 116 may extract data (e.g., message header information, etc.), and/or may insert data (e.g., a time stamp, etc.).

In step 208, the first and second sensor data are transmitted to the cloud service over a network according to a network communication protocol. As shown in FIG. 1, IP communication interface 122 is configured to transmit the first and second sensor data to cloud service 108 over network 110. IP communication interface 122 encapsulates the first sensor data according to a network communication protocol for messaging (e.g., HTTP, AMQP, MQTT), and transmits the encapsulated first sensor data in a network communication signal 120. Furthermore, IP communication interface 122 encapsulates the second sensor data according to a network communication protocol for messaging (e.g., HTTP, AMQP, MQTT), and transmits the encapsulated second sensor data in another instance of network communication signal 120. Note that IP communication interface 122 may encapsulate the first and second sensor data according to the same or different network communication protocols (e.g., depending on the corresponding sensor communication protocol the sensor data is received in, and/or based on other factor).

Figure 3:
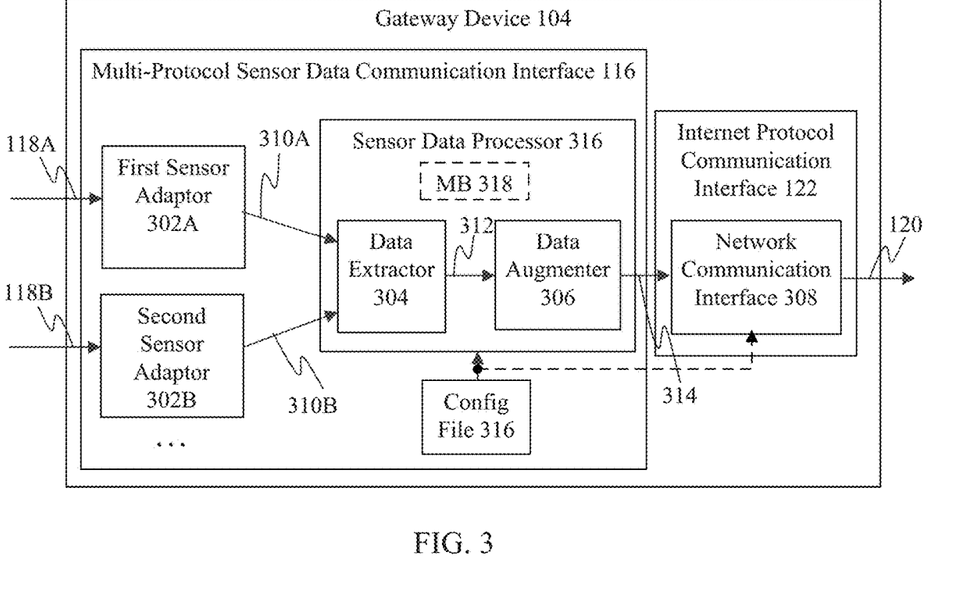
FIG. 3 shows a block diagram of a gateway device that contains a multi-protocol sensor data communication interface, according to an example embodiment.

In embodiments, flowchart 200 may be performed in various ways, and multi-sensor data communication interface 116 may be configured in various ways to handle communications of sensor data. For instance, FIG. 3 shows a block diagram of gateway device 104, according to an example embodiment. As shown in FIG. 3, gateway device 104 includes multi-protocol sensor data communication interface 116, which includes a first sensor adaptor 302A, a second sensor adaptor 302B, and a sensor data processor 316. Furthermore, gateway device 104 includes IP communication interface 122, which includes a network communication interface 308. Sensor data processor 316 includes a data extractor 304, a data augmenter 306, and an optional memory buffer (MB) 318. Multi-protocol sensor data communication interface 116 and IP communication interface 122 of FIG. 3 are described as follows with respect to FIGS. 4-10.

Figure 4:
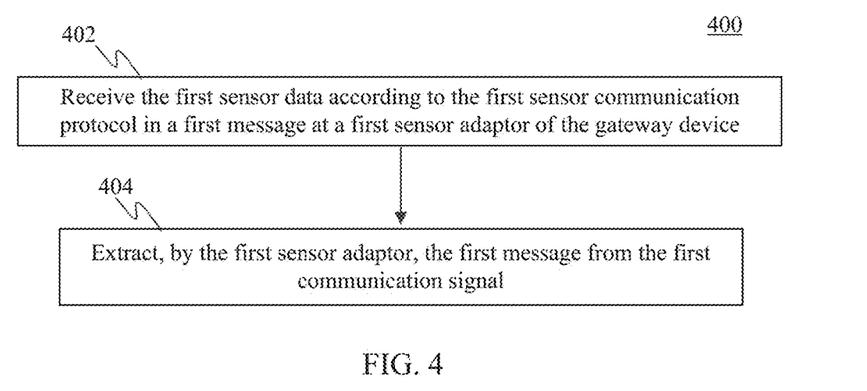
FIG. 4 shows a flowchart providing a process in a first sensor adaptor for unpacking a message containing sensor data from a first sensor communication protocol, according to an example embodiment.
Figure 5:
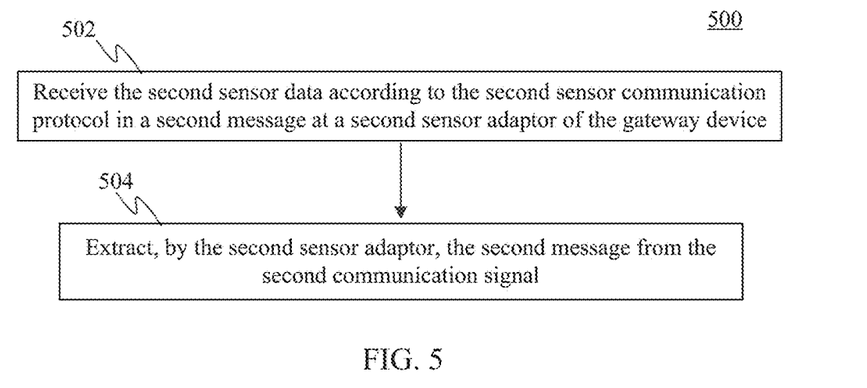
FIG. 5 shows a flowchart providing a process in a second sensor adaptor for unpacking a message containing sensor data from a second sensor communication protocol, according to an example embodiment.

For example, FIG. 4 shows a flowchart 400 providing a process in first sensor adaptor 302A for unpacking a message containing sensor data from a first sensor communication protocol, according to an example embodiment. FIG. 5 shows a flowchart 500 providing a process in second sensor adaptor 302B for unpacking a message containing sensor data from a second sensor communication protocol, according to an example embodiment. Flowcharts 400 and 500 are examples of steps 202 and 204 of flowchart 200 (FIG. 2), and illustrate how first and second sensor adaptors 302A and 302B (and optionally further sensor adaptors) enable multi-protocol sensor data communication interface 116 to support multiple sensor communication protocols. One or more additional sensor adaptors (not shown in FIG. 3) may operate according to flowcharts 400 and 500. Flowcharts 400 and 500 are described as follows.

Flowchart 400 begins with step 402. In step 402, the first sensor data is received according to the first sensor communication protocol in a first message at a first sensor adaptor of the gateway device. For example, as shown in FIG. 3, first sensor adaptor 302A receives communication signal 118A. First sensor adaptor 302A is configured to receive sensor data from sensors that communicate according to a particular sensor communication protocol, such as sensor 102A of FIG. 1. As described with respect to FIG. 1, communication circuit 112A packages first sensor data in a message in communication signal 118A. The message includes the first sensor data in a common standard data format. The message is encapsulated in a sensor communication protocol in communication signal 118A, such as a USB protocol, a serial data protocol, a Bluetooth® protocol, or other non-Internet-compatible messaging protocol.

In step 404, the first message is extracted from the first communication signal by the first sensor adaptor. In an embodiment, first sensor adaptor 302A of FIG. 3 is configured to receive and extract messages from sensor communication signals that encapsulate the messages according to a particular sensor communication protocol. As shown in FIG. 3, first sensor adaptor 302A generates/outputs a first message 310A, which is a message containing the first sensor data, which had been encapsulated in first communication signal 118A according to the sensor communication protocol associated with first sensor adaptor 302A.

For instance, in an embodiment, first sensor adaptor 302A may be configured to receive and extract sensor data messages from USB protocol communication signals. In other words, first sensor adaptor 302A may be configured to find and extract messages carried by the USB protocol in communication signals.

For example, in one USB implementation, USB data is located in USB data packets, which consist of a PID (packet identifier) followed by 0 to 1,024 bytes of data payload (up to 1,024 bytes for high-speed devices, up to 64 bytes for full-speed devices, and at most eight bytes for low-speed devices), and a 16-bit CRC (cyclical redundancy check). There are two basic forms of data packet, DATA0 and DATA1. A data packet is always be preceded by an address token, and is usually followed by a handshake token from the receiver back to the transmitter. The two packet types provide the 1-bit sequence number required by Stop-and-wait ARQ (automatic repeat-request).

Persons skilled in the relevant art(s) will understand how to locate and extract data messages from signals encapsulating data according to the USB protocol(s), and thus further details are not provided herein for reasons of brevity.

Flowchart 500 begins with step 502. In step 502, the second sensor data is received according to the second sensor communication protocol in a second message at a second sensor adaptor of the gateway device. For example, as shown in FIG. 3, second sensor adaptor 302B receives communication signal 118B. Second sensor adaptor 302B is configured to receive sensor data from sensors that communicate according to a particular sensor communication protocol, such as sensor 102B of FIG. 1. As described with respect to FIG. 1, communication circuit 112B packages second sensor data in a message in communication signal 118B. The message includes the second sensor data in a common standard data format. The message is encapsulated in a sensor communication protocol in communication signal 118B, such as a USB protocol, a serial data protocol, a Bluetooth® protocol, or other non-Internet-compatible messaging protocol.

In step 504, the second message is extracted from the second communication signal by the second sensor adaptor. In an embodiment, second sensor adaptor 302B of FIG. 3 is configured to receive and extract messages from sensor communication signals that encapsulate the messages according to a particular sensor communication protocol. As shown in FIG. 3, second sensor adaptor 302B generates/outputs a second message 310B, which is a message containing the second sensor data, which had been encapsulated in second communication signal 118B according to the sensor communication protocol associated with second sensor adaptor 302B.

For instance, in an embodiment, second sensor adaptor 302B may be configured to receive and extract sensor data messages from Bluetooth® protocol communication signals. In other words, second sensor adaptor 302B may be configured to find and extract messages carried by the Bluetooth® protocol in communication signals.

For example, in one Bluetooth® implementation, Bluetooth® data is located in Bluetooth® data packets, each data packet transmitted on one of 79 designated Bluetooth® channels. Persons skilled in the relevant art(s) will understand how to locate and extract data messages from signals encapsulating data according to the Bluetooth® protocol(s), and thus further details are not provided herein for reasons of brevity.

The references above to USB and Bluetooth® protocols with respect to flowcharts 400 and 500 are made for purposes of illustration. Flowcharts 400 and 500 are applicable to other types of sensor communication protocols.

As shown in FIG. 3, sensor data processor 316 receives first and second messages 310A and 310B. In an embodiment, MB 318 may be present. When present, MB 318 may receive first and second messages 310A and 310B, and any other messages output by sensor adaptors, and may buffer them. In this manner, sensor data processor 316 can process the messages in a serial fashion (e.g., in an order in which received, or other order), even in the event that messages are received from sensors (and sensor adaptors) faster than sensor data processor 316 can process them. In an embodiment, MB 318 may be used to buffer messages output sensor data processor 316 (processed messages 314) for network communication interface 308. Although shown in FIG. 3 as included in sensor data processor 316, MB 318 may be separate. MB 318 may be implemented in the form of any suitable physical hardware storage medium(s) (and associated queue logic), including one or more memory devices (e.g., random access memory), one or more magnetic storage mediums (e.g., hard drives), and/or further physical hardware storage medium(s).

Figure 6:
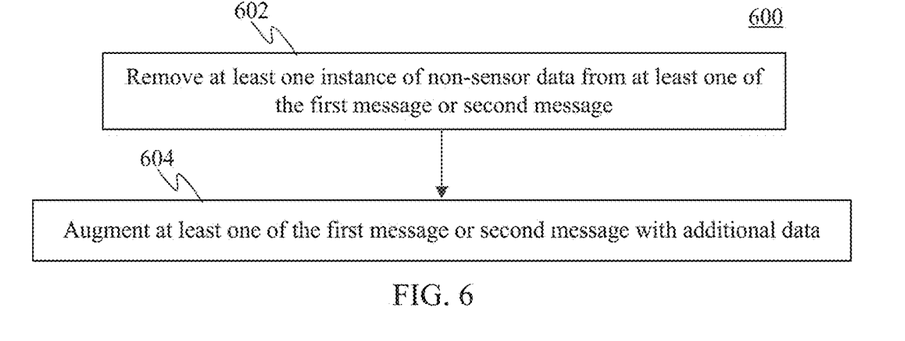
FIG. 6 shows a flowchart providing a process for processing a sensor data message, according to an example embodiment.

Sensor data processor 316 may operate according to step 206 of flowchart 200 (FIG. 2) to process sensor data in various ways, in embodiments. For instance, FIG. 6 shows a flowchart 600 providing a process for processing a sensor data message, according to an example embodiment. In an embodiment, sensor data processor 316 may operate according to flowchart 600. Either or both of the steps of flowchart 600 may be performed in embodiments, and may be performed in either order. Flowchart 600 is described as follows.

In step 602, at least one instance of non-sensor data is removed from at least one of the first message or second message. Data extractor 304 shown in FIG. 3 is optionally present. When present, data extractor 304 receives sensor data messages from sensor adaptors that are present in multi-protocol sensor data communication interface 116, such as first and second messages 310A and 310B. Data extractor 304 is configured to extract data from the messages that is not necessary to forward on to the cloud service (e.g., cloud service 108 in FIG. 1), such as data that is not sensor data related. For example, data extractor 304 may remove extraneous message information in first and/or second messages 310A and 310B, as inserted there by the transmitting sensors. For example, a message may be received from a sensor at gateway device 104 in the form of a message header+message data+message footer. In an embodiment, data extractor 304 removes a portion of all of the received message header and/or message footer from a received message, to leave the message data, which is the sensor data.

In step 604, at least one of the first message or second message is augmented with additional data. Data augmenter 306 shown in FIG. 3 is optionally present. When present, data augmenter 306 receives the sensor data messages from the sensor adaptors (after or before data extractor 304, when present), such as first and second messages 310A and 310B. Data augmenter 306 is configured to augment (add to and/or modify) the data included in the messages, to be forwarded on to the cloud service (e.g., cloud service 108 in FIG. 1). For example, data augmenter 306 may add time stamp information in first and/or second messages 310A and 310B, indicating a time/date at which a sensor captured the sensor data included in the message (as can be best ascertained by data augmenter 306).

As shown in FIG. 3, sensor data processor 316 (data extractor 304 and/or data augmenter 306) generates a processed message 314 for each of first and second messages 310A and 310B, which includes the corresponding modified message (e.g., augmented with data or with data removed).

Network communication interface 308 of IP communication interface 122 receives each processed message 314 (optionally buffered by MB 318). Network communication interface 308 is configured to transmit processed messages 314 to a cloud service encapsulated in communication signals according to one or more network communication protocols. For instance, network communication interface 308 may operate according to step 208 of flowchart 200 (FIG. 2). In one embodiment, network communication interface 308 is configured to encapsulate all sensor data messages according to a same network communication protocol. In another embodiment, network communication interface 308 is configured to encapsulate sensor data messages according to different network communication protocols.

Figure 7:
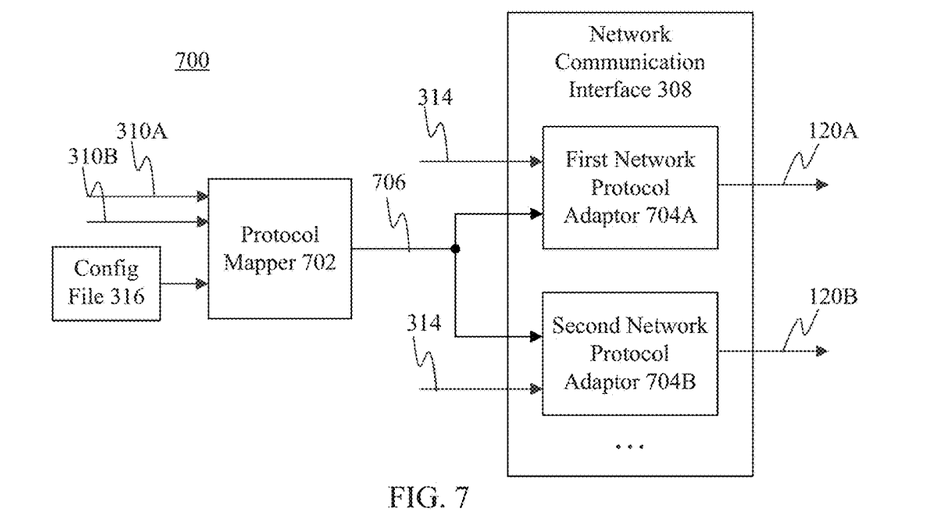
FIG. 7 shows a block diagram of a system for mapping sensor types to network communication protocols, according to an example embodiment.
Figure 8:
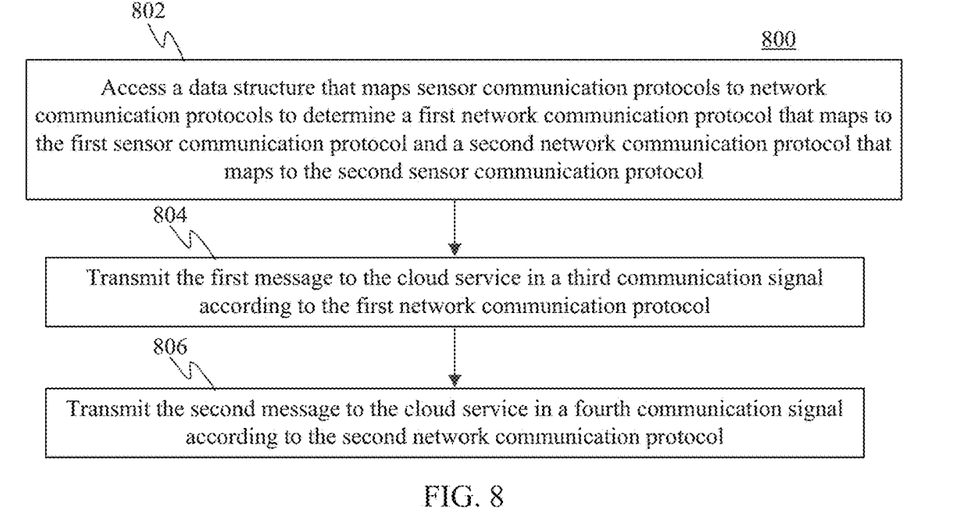
FIG. 8 shows a flowchart providing a process for mapping sensor types to network communication protocols, according to an example embodiment.

Network communication interface 308 may be configured in various ways, and may operate in various ways to perform its functions. For instance, in an embodiment, network communication interface 308 may be configured as shown in FIG. 7. FIG. 7 shows a block diagram of a system 700 for mapping sensor types to network communication protocols, according to an example embodiment. System 700 may be implemented in IP communication interface 122 in an embodiment. As shown in FIG. 7, system 700 includes a protocol mapper 702 and network communication interface 308, and network communication interface 308 includes a first network protocol adaptor 704A and a second network protocol adaptor 704B. System 700 is described with respect to FIG. 8. FIG. 8 shows a flowchart 800 providing a process for mapping sensor types to network communication protocols, according to an example embodiment. In an embodiment, network communication interface 308 may operate according to flowchart 800. Flowchart 800 and system 700 are described as follows.

Flowchart 800 begins with step 802. In step 802, a data structure is accessed that maps sensor communication protocols to network communication protocols to determine a first network communication protocol that maps to the first sensor communication protocol and a second network communication protocol that maps to the second sensor communication protocol. In an embodiment, protocol mapper 702 accesses configuration file 316. Configuration file 316 is a data structure (e.g., a list) that maps sensor communication protocols to network communication protocols. Protocol mapper 702 is configured to scan through configuration file 316 to determine a network communication protocol corresponding to each sensor communication protocol received in sensor communication signals, such as sensor communication signals 310A and 310B. For a particular sensor communication signal, protocol mapper 702 determines the corresponding network communication protocol, which is indicated in network adaptor enable signal(s) 706.

For example, it may be desired for sensor data messages that are received from sensors according to a first sensor communication protocol, such as USB, to be transmitted to the cloud service according to a first network communication protocol, such as AMQP. In another example, it may be desired for sensor data messages that are received from sensors according to a second sensor communication protocol, such as Bluetooth®, to be transmitted to the cloud service according to a second network communication protocol, such as HTTP. Configuration file 316 may map any sensor communication protocol to any network communication protocol, for any number of sensor and network communication protocols. This may be useful, for instance, because the structure of particular sensor data (received from sensors encapsulating sensor data according to a particular sensor communication protocol) may be more efficiently provided to the cloud service encapsulated in a particular network communication protocol rather than others. This may be due to any reason(s), including a particular type of sensor generating sensor data messages having a particular number of sensor data fields, length of sensor data fields, format of sensor data fields, etc.

In step 804, the first message is transmitted to the cloud service in a third communication signal according to the first network communication protocol. For example, as shown in FIG. 7, first and second network protocol adaptors 704A and 704B receive network adaptor enable signal(s) 706. Furthermore, first network protocol adaptors 704A and 704B receives processed message 314. Processed message 314 is generated by sensor data processor 316 as described above, for a corresponding sensor communication signal (e.g., one of sensor communication signals 118A and 11B in FIG. 1), corresponding to one of sensor communication signals 310A and 310B.

First network protocol adaptor 704A is configured to generate a network communication signal that encapsulates message 314 according to a first network communication protocol (e.g., AMQP). Second network protocol adaptor 704B is configured to generate a network communication signal that encapsulates message 314 according to a second network communication protocol (e.g., HTTP). First and second network protocol adaptors 704A and 704B generate a network communication signal for message 314 when enabled by network adaptor enable signal(s) 706. Any number of additional network protocol adaptors may be present that generate network communications signals according to any number of further network communication protocols.

Accordingly, in one example, first network protocol adaptor 704A is configured to generate a network communication signal that encapsulates a received message 314 according AMQP. Furthermore, the sensor data of first message 310A may have been received in first sensor communication signal 118A by first sensor adaptor 302A, encapsulated in the USB protocol. If protocol mapper 702 maps the USB protocol (sensor) to the AMQP protocol (network), protocol mapper 702 generates by network adaptor enable signal(s) 706 to enable first network protocol adaptor 704A (and to disable second network protocol adaptor 704B, etc.). As such, first network protocol adaptor 704A is configured to encapsulate message 314 in the AMQP protocol, and to transmit the encapsulated message from gateway device 104 as network communication signal 120A.

In step 806, the second message is transmitted to the cloud service in a fourth communication signal according to the second network communication protocol. As described above, second network protocol adaptor 704B is configured to generate a network communication signal that encapsulates message 314 according to a second network communication protocol, such as HTTP, when enabled by network adaptor enable signal(s) 706. Accordingly, in one example, the sensor data of second message 310B may have been received in second sensor communication signal 118B by second sensor adaptor 302B, encapsulated in the Bluetooth® protocol. If protocol mapper 702 maps the Bluetooth® protocol (sensor) to the HTTP protocol (network), protocol mapper 702 generates by network adaptor enable signal(s) 706 to enable first network protocol adaptor 704B (and to disable first network protocol adaptor 704A, etc.). As such, second network protocol adaptor 704B is configured to encapsulate message 314 in the HTTP protocol, and to transmit the encapsulated message from gateway device 104 as network communication signal 120B.

As described above, to enable many types of sensors to interface with multi-protocol sensor data communication interface 116 (FIG. 1), multi-protocol sensor data communication interface 116 may be configured for plug-in-ability for sensor adaptors. Each plugged-in sensor adaptor may enable further sensor types to communicate with cloud service 108 through gateway device 104. The plugged-in sensor adaptors each enable sensor data messages to be received according to another sensor communication protocol.

Figure 9:
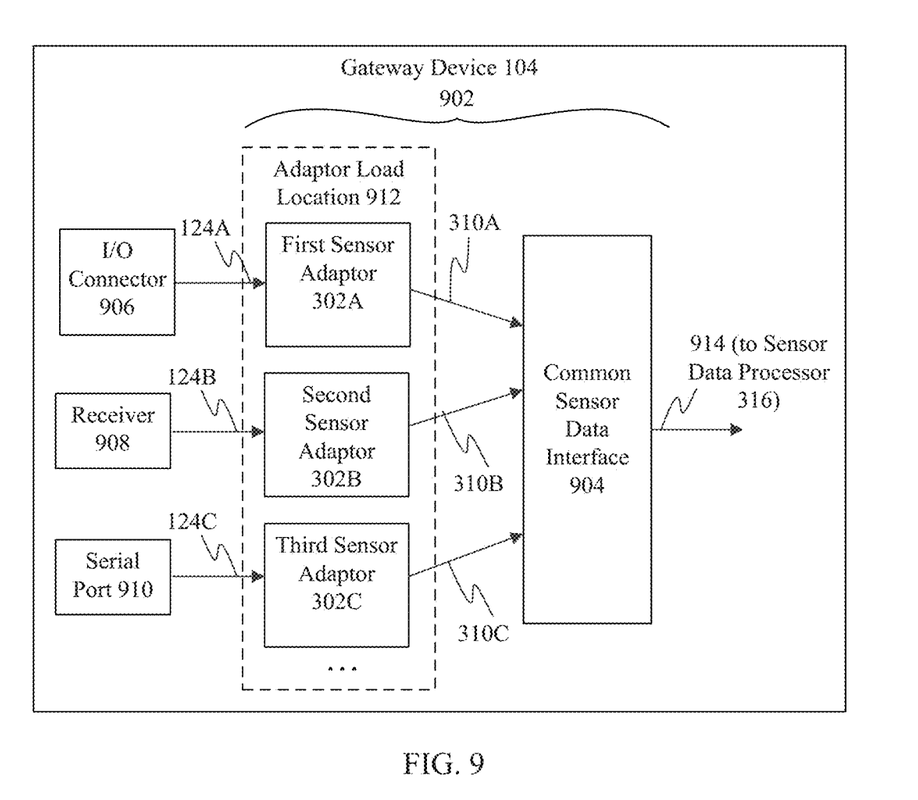
FIG. 9 shows a block diagram of gateway device configured to receive plug-in sensor adaptors, according to an example embodiment.
Figure 10:
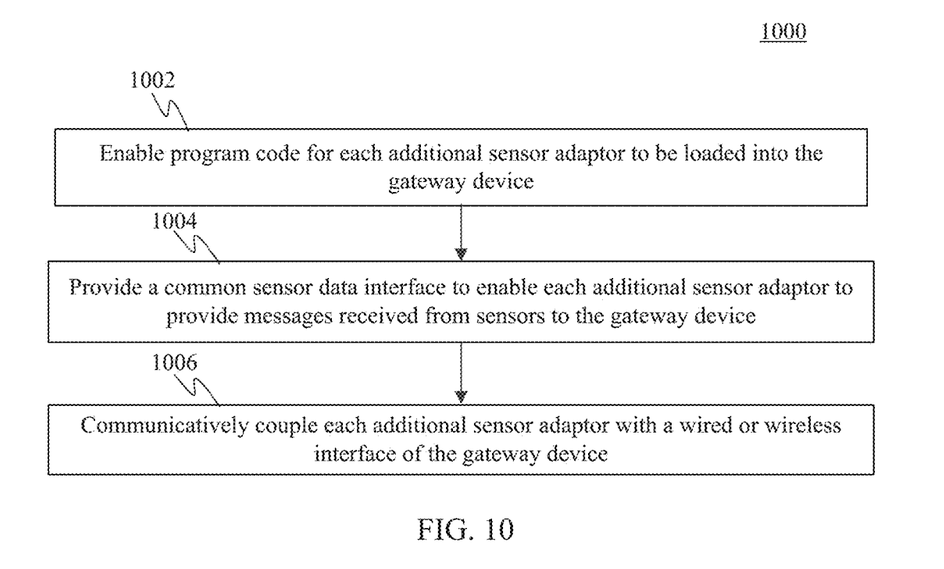
FIG. 10 shows a flowchart providing a process for enabling sensor adaptors to be plugged into a gateway device, according to an example embodiment.

Gateway device 104 may be configured in various ways, and may operate in various ways, to enable the plugging-in of sensor adaptors. For instance, FIG. 9 shows a block diagram of a portion of gateway device 104 that is configured for plug-in sensor adaptors, according to an example embodiment. As shown in FIG. 9, gateway device 104 includes a sensor adaptor plug-in interface 902. Sensor adaptor plug-in interface 902 is configured to enable sensor adaptors to plug into gateway device 104 without modification to gateway device 104. As shown in FIG. 9, sensor adaptor plug-in interface 902 includes a common sensor data interface 904 and an adaptor load location 912. Sensor adaptor plug-in interface 902 may operate according to FIG. 10. FIG. 10 shows a flowchart 1000 providing a process for enabling sensor adaptors to be plugged into gateway device 104, according to an example embodiment. The steps of flowchart 1000 may be performed in any order. Flowchart 1000 and sensor adaptor plug-in interface 902 are described as follows.

Flowchart 1002 begins with step 1002. In step 1002, program code for each additional sensor adaptor is enabled to be loaded into the gateway device. In an embodiment, a developer may develop program code configured to extract sensor data messages encapsulated according to a particular sensor communication protocol (e.g., USB protocol, a serial protocol, a Bluetooth® protocol, etc.) from received communication signals. The sensor adaptor program code may be loaded into adaptor load location 912 in storage (e.g., a physical hardware storage medium, such as memory device, hard disk drive) of gateway device 104. For example, FIG. 9 shows a third sensor adaptor 302C loaded into adaptor load location 912, where first and second sensor adaptors 302A and 302B are already loaded. Sensor adaptor program code 302C may be configured for hot plug-and-play, may execute independently of the program code of other sensor adaptors, may be configured to recover from sensor disconnects or bad data, may be capable of executing in the limited constraints of small hardware (e.g., a single-board computer such as a Raspberry Pi™ developed by the Raspberry Pi Foundation of Caldecote, Cambridgeshire, United Kingdom), and/or may be developed to have further and/or alternative traits.

In step 1004, a common sensor data interface is provided to enable each additional sensor adaptor to provide messages received from sensors to the gateway device. As shown in FIG. 9, sensor adaptors, including third sensor adaptor 302C, are configured to interface with common sensor data interface 904 to provide sensor data messages, such as message 310C, in the form of a common standard data format (e.g., JSON). As such, sensor adaptors, such as third sensor adaptor 302C, may be configured to pass sensor data messages (e.g., message 310C) to common sensor data interface 904 according to a predetermined format (e.g., a predetermined message name convention, etc.).

In step 1006, each additional sensor adaptor is communicatively coupled with a wired or wireless interface of the gateway device. In an embodiment, each sensor adaptor loaded into adaptor load location 912 is interfaced with a corresponding I/O (input/output) mechanism of gateway device 104 (e.g., by assigning a port, etc.).

For instance, where first sensor adaptor 302A is configured to support sensor data messages encapsulated according to the USB protocol, first sensor adaptor 302A may be communicatively coupled with I/O connector 906 of gateway device 104. I/O connector 906 may be a USB connector configured to receive wired USB protocol communication signals, which are communicatively coupled to first sensor adaptor 302A.

In another example, where second sensor adaptor 302B is configured to support sensor data messages encapsulated according to the Bluetooth® protocol, second sensor adaptor 302B may be communicatively coupled with Receiver 908. Receiver 908 may be a Bluetooth® receiver of gateway device 104 that is configured to receive wireless Bluetooth® protocol communication signals, which are communicatively coupled to second sensor adaptor 302B.

In still another example, where third sensor adaptor 302B is configured to support sensor data messages encapsulated according to a serial communication protocol, third sensor adaptor 302B may be communicatively coupled with serial port 910 of gateway device 104. Serial port 910 may be a serial connector configured to receive wired serial protocol communication signals, which are communicatively coupled to third sensor adaptor 302C.

In other embodiments, other types of serial communication protocols may be supported by additional sensor adaptors plugged into gateway device 104 as described with respect to FIGS. 9 and 10.

III. Example Mobile and Stationary Device Embodiments

Gateway device 104, cloud service 108, communication circuits 112A and 112B, multi-protocol sensor data communication interface 116, IP communication interface 122, first sensor adaptor 302A, second sensor adaptor 302B, third sensor adaptor 302C, data extractor 304, data augmenter 306, network communication interface 308, sensor data processor 316, protocol mapper 702, first network protocol adaptor 704A, second network protocol adaptor 704B, common sensor data interface 904, flowchart 200, flowchart 400, flowchart 500, flowchart 600, flowchart 800, and flowchart 1000 may be implemented in hardware, or hardware combined with software and/or firmware. For example, cloud service 108, communication circuits 112A and 112B, multi-protocol sensor data communication interface 116, IP communication interface 122, first sensor adaptor 302A, second sensor adaptor 302B, third sensor adaptor 302C, data extractor 304, data augmenter 306, network communication interface 308, sensor data processor 316, protocol mapper 702, first network protocol adaptor 704A, second network protocol adaptor 704B, common sensor data interface 904, flowchart 200, flowchart 400, flowchart 500, flowchart 600, flowchart 800, and/or flowchart 1000 may be implemented as computer program code/instructions configured to be executed in one or more processors and stored in a computer readable storage medium. Alternatively, cloud service 108, communication circuits 112A and 112B, multi-protocol sensor data communication interface 116, IP communication interface 122, first sensor adaptor 302A, second sensor adaptor 302B, third sensor adaptor 302C, data extractor 304, data augmenter 306, network communication interface 308, sensor data processor 316, protocol mapper 702, first network protocol adaptor 704A, second network protocol adaptor 704B, common sensor data interface 904, flowchart 200, flowchart 400, flowchart 500, flowchart 600, flowchart 800, and/or flowchart 1000 may be implemented as hardware logic/electrical circuitry.

For instance, in an embodiment, one or more, in any combination, of cloud service 108, communication circuits 112A and 112B, multi-protocol sensor data communication interface 116, IP communication interface 122, first sensor adaptor 302A, second sensor adaptor 302B, third sensor adaptor 302C, data extractor 304, data augmenter 306, network communication interface 308, sensor data processor 316, protocol mapper 702, first network protocol adaptor 704A, second network protocol adaptor 704B, common sensor data interface 904, flowchart 200, flowchart 400, flowchart 500, flowchart 600, flowchart 800, and/or flowchart 1000 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 11:
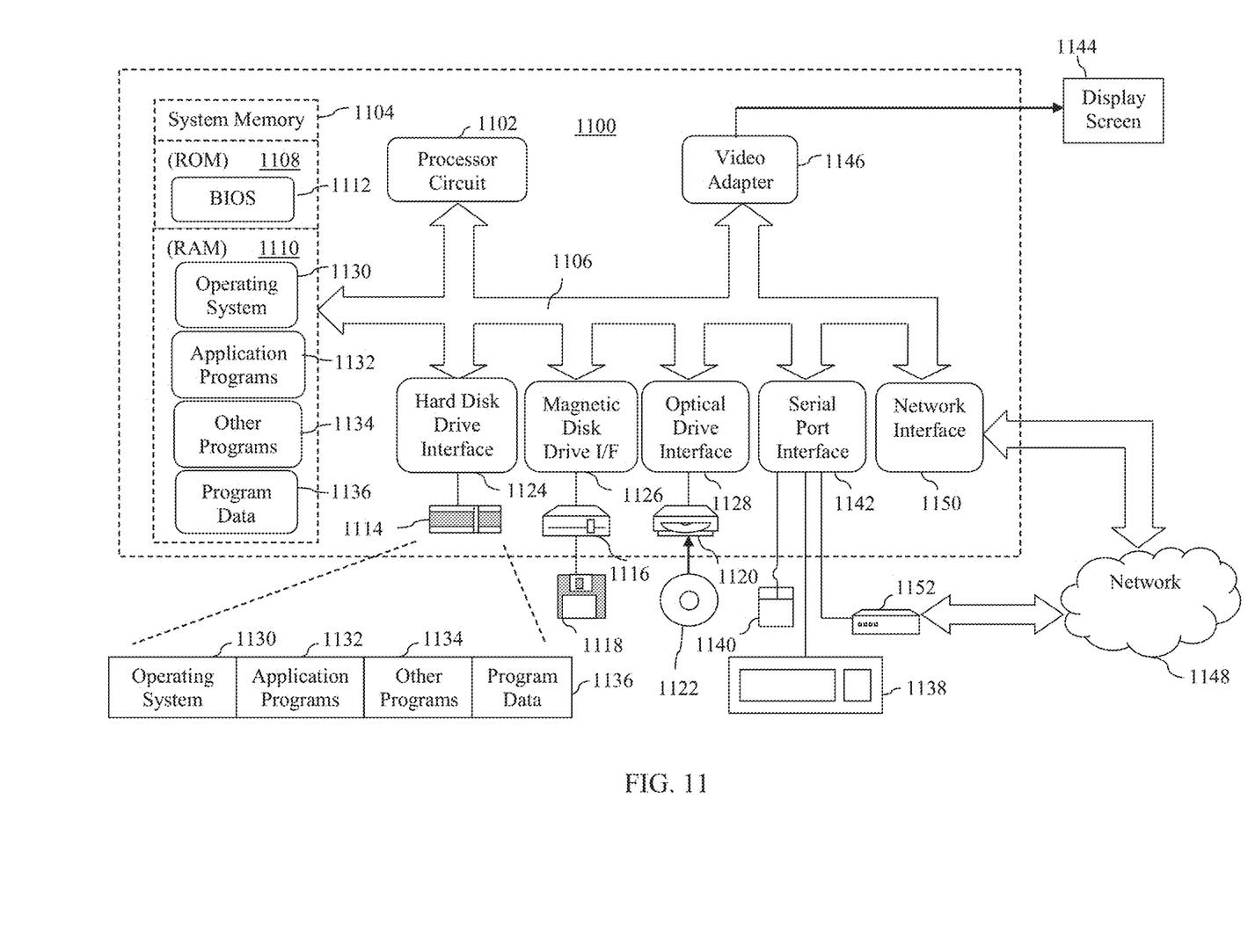
FIG. 11 shows a block diagram of an example computing device that may be used to implement embodiments.

FIG. 11 depicts an exemplary implementation of a computing device 1100 in which embodiments may be implemented. For example, gateway device 100 may be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing cloud service 108, communication circuits 112A and 112B, multi-protocol sensor data communication interface 116, IP communication interface 122, first sensor adaptor 302A, second sensor adaptor 302B, third sensor adaptor 302C, data extractor 304, data augmenter 306, network communication interface 308, sensor data processor 316, protocol mapper 702, first network protocol adaptor 704A, second network protocol adaptor 704B, common sensor data interface 904, flowchart 200, flowchart 400, flowchart 500, flowchart 600, flowchart 800, and/or flowchart 1000 (including any suitable step of flowcharts 200, 400, 500, 600, 800, 1000), and/or further embodiments described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adaptor 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nano-technology-based storage devices, and further types of physical/tangible hardware storage media (including memory 1220 of FIG. 12). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

In an embodiment, a method in a gateway device comprises: receiving first sensor data from a first sensor device in a first communication signal according to a first sensor communication protocol; receiving second sensor data from a second sensor device in a second communication signal according to a second sensor communication protocol; processing the first and second sensor data for transmission to a cloud service; and transmitting the first and second sensor data to the cloud service over a network according to a network communication protocol.

In an embodiment, the receiving first sensor data comprises: receiving the first sensor data according to the first sensor communication protocol in a first message at a first sensor adaptor of the gateway device, the first sensor adaptor configured for the first sensor communication protocol, and extracting, by the first sensor adaptor, the first message from the first communication signal; and wherein said receiving second sensor data comprises: receiving the second sensor data according to the second sensor communication protocol in a second message at a second sensor adaptor of the gateway device, the second sensor adaptor configured for the second sensor communication protocol, and extracting, by the second sensor adaptor, the second message from the second communication signal.

In an embodiment, the first and second messages are both formatted according to a same open standard data format.

In an embodiment, the processing the first and second sensor data for transmission to a cloud service comprises: removing at least one instance of non-sensor data from at least one of the first message or second message.

In an embodiment, the open standard data format is extensible, and said processing the first and second sensor data for transmission to a cloud service comprises: augmenting at least one of the first message or second message with additional data.

In an embodiment, the transmitting the first and second sensor data to the cloud service over a network according to a network communication protocol comprises: accessing a data structure that maps sensor communication protocols to network communication protocols to determine a first network communication protocol that maps to the first sensor communication protocol and a second network communication protocol that maps to the second sensor communication protocol; transmitting the first message to the cloud service in a third communication signal according to the first network communication protocol; and transmitting the second message to the cloud service in a fourth communication signal according to the second network communication protocol.

In an embodiment, the method further comprises: enabling additional sensor adaptors to plug into the gateway device without modification to the gateway device.

In an embodiment, the enabling additional sensor adaptors to plug into the gateway device without modification to the gateway device comprises: enabling program code for each additional sensor adaptor to be loaded into the gateway device; providing a common sensor data interface to enable each additional sensor adaptor to provide messages received from sensors to the gateway device, the common sensor data interface configured to receive the messages according to the open standard data format; and communicatively coupling each additional sensor adaptor with a wired or wireless interface of the gateway device.

In an embodiment, a gateway device comprises: a plurality of sensor adaptors configured to receive sensor data in communication signals from sensor devices, each sensor adaptor configured to extract sensor data encapsulated according to a respective sensor communication protocol; a memory buffer configured to buffer the sensor data extracted by the sensor adaptors; a sensor data processor configured to process the extracted sensor data for transmission to a cloud service; and a network communication interface configured to transmit the processed sensor data to the cloud service over a network according to a network communication protocol.

In an embodiment, the plurality of sensor adaptors comprises: a first sensor adaptor configured to receive first sensor data in a first message encapsulated in a first communication signal according to a first sensor communication protocol, and to extract the first message from the first communication signal; and a second sensor adaptor configured to receive second sensor data in a second message encapsulated in a second communication signal according to a second sensor communication protocol, and to extract the second message from the second communication signal; and the first and second messages both formatted according to a same open standard data format.

In an embodiment, the open standard data format is extensible, and the sensor data processor is configured to: remove at least one instance of non-sensor data from at least one of the first message or second message, and augment at least one of the first message or second message with additional data.

In an embodiment, the gateway device further comprises: a protocol mapper configured to access a data structure that maps sensor communication protocols to network communication protocols, the protocol mapper configured to determine from the data structure a first network communication protocol that maps to the first sensor communication protocol and a second network communication protocol that maps to the second sensor communication protocol; and wherein the network communication interface comprises: a first network protocol adaptor configured to encapsulate the first message in a third communication signal according to the first network communication protocol; and a second network protocol adaptor configured to encapsulate the second message in a fourth communication signal according to the second network communication protocol, the third and fourth communication signals transmitted to the cloud service.

In an embodiment, the gateway device further comprises: a sensor adaptor plug-in interface configured to enable sensor adaptors to plug into the gateway device without modification to the gateway device.

In an embodiment, the sensor adaptor plug-in interface comprises: a common sensor data interface configured to enable program code of sensor adaptors to provide messages extracted from received communication signals according to the corresponding sensor communication protocols to the sensor data processor, the messages configured according to a same standard data format.

In an embodiment, a computing device in a computing device comprises: at least one processor circuit; a plurality of sensor adaptors, implemented as program code by the at least one processor circuit, configured to receive sensor data in communication signals from sensor devices, each sensor adaptor configured to extract sensor data encapsulated according to a respective sensor communication protocol; a memory buffer configured to buffer the sensor data extracted by the sensor adaptors; a sensor data processor, implemented as program code by the at least one processor circuit, configured to process the extracted sensor data for transmission to a cloud service; and a network communication interface configured to transmit the processed sensor data to the cloud service over a network according to a network communication protocol.

In an embodiment, the plurality of sensor adaptors comprises: a first sensor adaptor configured to receive first sensor data in a first message encapsulated in a first communication signal according to a first sensor communication protocol, and to extract the first message from the first communication signal; and a second sensor adaptor configured to receive second sensor data in a second message encapsulated in a second communication signal according to a second sensor communication protocol, and to extract the second message from the second communication signal; and the first and second messages both formatted according to a same open standard data format.

In an embodiment, the open standard data format is extensible, and the sensor data processor is configured to: remove at least one instance of non-sensor data from at least one of the first message or second message, and augment at least one of the first message or second message with additional data.

In an embodiment, the computing device further comprises: a protocol mapper configured to access a data structure that maps sensor communication protocols to network communication protocols, the protocol mapper configured to determine from the data structure a first network communication protocol that maps to the first sensor communication protocol and a second network communication protocol that maps to the second sensor communication protocol; and wherein the network communication interface comprises: a first network protocol adaptor configured to encapsulate the first message in a third communication signal according to the first network communication protocol; and a second network protocol adaptor configured to encapsulate the second message in a fourth communication signal according to the second network communication protocol, the third and fourth communication signals transmitted to the cloud service.

In an embodiment, the computing device further comprises: a sensor adaptor plug-in interface configured to enable sensor adaptors to plug into the gateway device without modification to the gateway device.

In an embodiment, the sensor adaptor plug-in interface comprises: a common sensor data interface configured to enable program code of sensor adaptors to provide messages extracted from received communication signals according to the corresponding sensor communication protocols to the sensor data processor, the messages configured according to a same open standard data format.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computing device, comprising:
at least one processor circuit;
a plurality of sensor adaptors, implemented as program code by the at least one processor circuit, configured to receive sensor data in messages encapsulated in communication signals from sensor devices, each sensor adaptor configured to extract sensor data encapsulated according to a respective sensor communication protocol, the messages received and formatted according to a same common message language;
a memory buffer configured to buffer the sensor data extracted by the sensor adaptors;
a sensor data processor, implemented as program code by the at least one processor circuit, configured to process the extracted sensor data for transmission to a cloud service;
a protocol mapper configured to map each of a plurality of sensor communication protocols to a particular network communication protocol of a plurality of network communication protocols that are supported by the computing device and the cloud service; and
a network communication interface configured to transmit the processed sensor data to the cloud service over a network, each instance of processed sensor data transmitted according to a network communication protocol mapped from the sensor communication protocol encapsulating the corresponding received sensor data, the protocol mapper configured to access a data structure that includes mappings of the sensor communication protocols to the network communication protocols and to scan the data structure to determine a first network communication protocol corresponding to the first sensor communication protocol, and a second network communication protocol corresponding to the second sensor communication protocol.

2. The computing device of claim 1, further comprising:
a sensor adaptor plug-in interface configured to enable sensor adaptors to plug into the computing device.

3. The computing device of claim 2, wherein the sensor adaptor plug-in interface is further configured to enable program code for each additional sensor adaptor to be loaded into the computing device;
wherein the sensor adaptor plug-in interface includes:
a common sensor data interface to enable each additional sensor adaptor to provide messages received from sensors to the computing device, the common sensor data interface configured to receive the messages according to an open standard data format.

4. The computing device of claim 3, wherein the common sensor data interface is configured to enable program code of sensor adaptors to provide messages extracted from received communication signals according to the corresponding sensor communication protocols to the sensor data processor.

5. The computing device of claim 1, wherein the plurality of sensor adaptors comprise:
a first sensor adaptor configured to receive first sensor data in a first message encapsulated in a first communication signal according to a first sensor communication protocol, and to extract the first message from the first communication signal; and
a second sensor adaptor configured to receive second sensor data in a second message encapsulated in a second communication signal according to a second sensor communication protocol different from the first sensor communication signal, and to extract the second message from the second communication signal.

6. The computing device of claim 5, wherein the network communication interface comprises:
a first network protocol adaptor configured to encapsulate the first message in a third communication signal according to the first network communication protocol; and
a second network protocol adaptor configured to encapsulate the second message in a fourth communication signal according to the second network communication protocol, the third and fourth communication signals transmitted to the cloud service.

7. The computing device of claim 1, wherein the plurality of network communication protocols comprises at least one of:
an advanced message queuing protocol;
a hypertext transfer protocol; or
a message queuing telemetry transport protocol.

8. A method in a computing device, comprising:
receiving sensor data in messages encapsulated in communication signals from sensor devices;
extracting sensor data encapsulated according to a sensor communication protocol using a corresponding sensor adaptor of a plurality of sensor adaptors, the messages received and formatted according to a same common message language;
buffering the sensor data extracted by the sensor adaptors;
processing the extracted sensor data for transmission to a cloud service;

mapping each of a plurality of sensor communication protocols to a particular network communication protocol of a plurality of network communication protocols that are supported by the computing device and the cloud service; and transmitting the processed sensor data to the cloud service over a network, each instance of processed sensor data transmitted according to a network communication protocol mapped from the sensor communication protocol encapsulating the corresponding received sensor data;

said mapping comprising accessing a data structure that includes mappings of the sensor communication protocols to the network communication protocols and scanning the data structure to determine a first network communication protocol corresponding to the first sensor communication protocol, and a second network communication protocol corresponding to the second sensor communication protocol.

9. The method of claim 8, further comprising:
plugging a sensor adaptor into a sensor adaptor plug-in interface of the computing device.

10. The method of claim 9, wherein said plugging comprises:
enabling program code for each additional sensor adaptor to be loaded into the computing device;
providing a common sensor data interface to enable each additional sensor adaptor to provide messages received from sensors to the computing device, the common sensor data interface configured to receive the messages according to the common message language; and
communicatively coupling each additional sensor adaptor with a wired or wireless interface of the computing device.

11. The method of claim 10, wherein the common sensor data interface is configured to enable program code of sensor adaptors to provide messages extracted from received communication signals according to the corresponding sensor communication protocols to a sensor data processor.

12. The method of claim 8, wherein receiving comprises:
receiving first sensor data at a first sensor adaptor of the computing device, the first sensor adaptor configured for a first sensor communication protocol, and
receiving second sensor data at a second sensor adaptor of the computing device, the second sensor adaptor configured for a second sensor communication protocol;
wherein said extracting comprises:
extracting, by the first sensor adaptor, a first message from the first communication signal, and
extracting, by the second sensor adaptor, a second message from the second communication signal.

13. The method of claim 12, wherein said transmitting comprises:
encapsulating the first message in a third communication signal according to the first network communication protocol using a first network protocol adaptor;
encapsulating the second message in a fourth communication signal according to the second network communication protocol using a second network protocol adaptor; and
transmitting the third and fourth communication signals to the cloud service.

14. The method of claim 8, wherein the plurality of network communication protocols comprises at least one of:
an advanced message queuing protocol;
a hypertext transfer protocol; or
a message queuing telemetry transport protocol.

15. A computer-readable storage medium comprising computer-executable instructions that, when executed by a processor of a computing device, perform a method comprising:
receiving sensor data in messages encapsulated in communication signals from sensor devices;
extracting sensor data encapsulated according to a sensor communication protocol using a corresponding sensor adaptor of a plurality of sensor adaptors, the messages received and formatted according to a same common message language;
buffering the sensor data extracted by the sensor adaptors;
processing the extracted sensor data for transmission to a cloud service;
mapping each of a plurality of sensor communication protocols to a particular network communication protocol of a plurality of network communication protocols that are supported by the computing device and the cloud service; and
transmitting the processed sensor data to the cloud service over a network, each instance of processed sensor data transmitted according to a network communication protocol mapped from the sensor communication protocol encapsulating the corresponding received sensor data;
said mapping comprising accessing a data structure that includes mappings of the sensor communication protocols to the network communication protocols and scanning the data structure to determine a first network communication protocol corresponding to the first sensor communication protocol, and a second network communication protocol corresponding to the second sensor communication protocol.

16. The computer-readable storage medium of claim 15, further comprising:
plugging a sensor adaptor into a sensor adaptor plug-in interface of the computing device.

17. The computer-readable storage medium of claim 16, wherein said plugging comprises:
enabling program code for each additional sensor adaptor to be loaded into the computing device;
providing a common sensor data interface to enable each additional sensor adaptor to provide messages received from sensors to the computing device, the common sensor data interface configured to receive the messages according to the common message language; and
communicatively coupling each additional sensor adaptor with a wired or wireless interface of the computing device.

18. The computer-readable storage medium of claim 17, wherein the common sensor data interface is configured to enable program code of sensor adaptors to provide messages extracted from received communication signals according to the corresponding sensor communication protocols to a sensor data processor.

19. The computer-readable storage medium of claim 15, wherein receiving comprises:
receiving first sensor data at a first sensor adaptor of the computing device, the first sensor adaptor configured for a first sensor communication protocol, and
receiving second sensor data at a second sensor adaptor of the computing device, the second sensor adaptor configured for a second sensor communication protocol;
wherein said extracting comprises:
extracting, by the first sensor adaptor, a first message from the first communication signal, and extracting, by the second sensor adaptor, a second message from the second communication signal.

20. The computer-readable storage medium of claim 15, wherein the plurality of network communication protocols comprises at least one of:
- an advanced message queuing protocol;
- a hypertext transfer protocol; or
- a message queuing telemetry transport protocol.

* * * * *